J. A. Benedict,
Cultivator.
No. 91,303. Patented June 15, 1869.

Witnesses:
Hinchman
Jno. R. Brooks

Inventor:
J. A. Benedict
Wmm
attorney.

I. A. BENEDICT, OF WEST SPRINGFIELD, PENNSYLVANIA.

*Letters Patent No. 91,303, dated June 15, 1869.*

IMPROVEMENT IN CULTIVATORS.

The Schedule referred to in these Letters Patent and making part of the same.

*To all whom it may concern:*

Be it known that I, I. A. BENEDICT, of West Springfield, in the county of Erie, and State of Pennsylvania, have invented a new and useful Improvement in Cultivators; and I do hereby declare that the following is a full, clear, and exact description thereof, which will enable others skilled in the art to make and use the same, reference being had to the accompanying drawing, forming part of this specification.

This invention relates to improvements in cultivating-implements for working between the rows of corn or other plants, and has for its object to provide a cultivator that will work the ground as much as possible between the rows, without throwing it on the plants, especially when small.

It consists of a common shovel-plow, with broad, low wings or side-plates attached to each side, as hereinafter more fully specified.

Similar letters of reference indicate corresponding parts.

Figure 1:
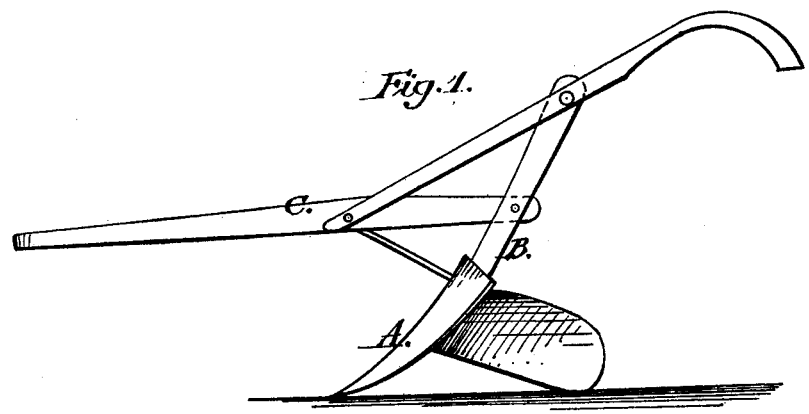
Figure 1 represents a side elevation of my improved cultivator.
Figure 2:
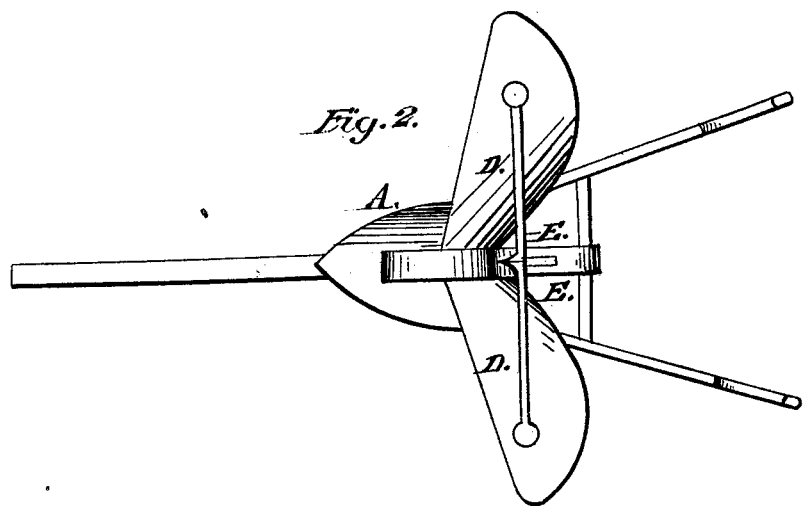
Figure 2 represents a plan of the bottom thereof.

A represents a shovel-plow of ordinary construction, connected to a stem, B, and beam c, to which I connect the broad side-plates D, extending laterally nearly at right angles to the beam, the inner ends projecting under the plow A, and riveted thereto or otherwise secured.

The cutting edges of these plates are higher at the inner ends than the plow A, and descend towards the outer ends, which fall about as low as the said plow A, so as not to move all the earth raised by the plow A to the rows of plants, but in effect to make a central and two side furrows, turning the earth from the latter up to the plants, and skimming the whole surface of the ground between the extreme points of the blades D, cutting all weeds, grass, &c.

The blades D are firmly braced to the stem B by the braces E attached to the under side.

Having thus described my invention,

What I claim as new, and desire to secure by Letters Patent, is—

The combination, with the cultivator-plow A, of the plates D, when arranged as specified.

I. A. BENEDICT.

Witnesses:
I. NEWTON MILLER,
JOHN STEUNER.